Nov. 5, 1963 C. HOROWITZ ETAL 3,109,456
DASH CONTROL VALVE
Filed Aug. 11, 1961 4 Sheets-Sheet 1

INVENTORS.
CHARLES HOROWITZ
HAROLD L. DOBRIKIN
BY Parker & Carter
Attorneys.

INVENTORS.
CHARLES HOROWITZ
HAROLD L. DOBRIKIN
BY Parker & Carter
Attorneys.

INVENTOR.
CHARLES HOROWITZ
HAROLD L. DOBRIKIN
BY Parker & Carter
Attorneys.

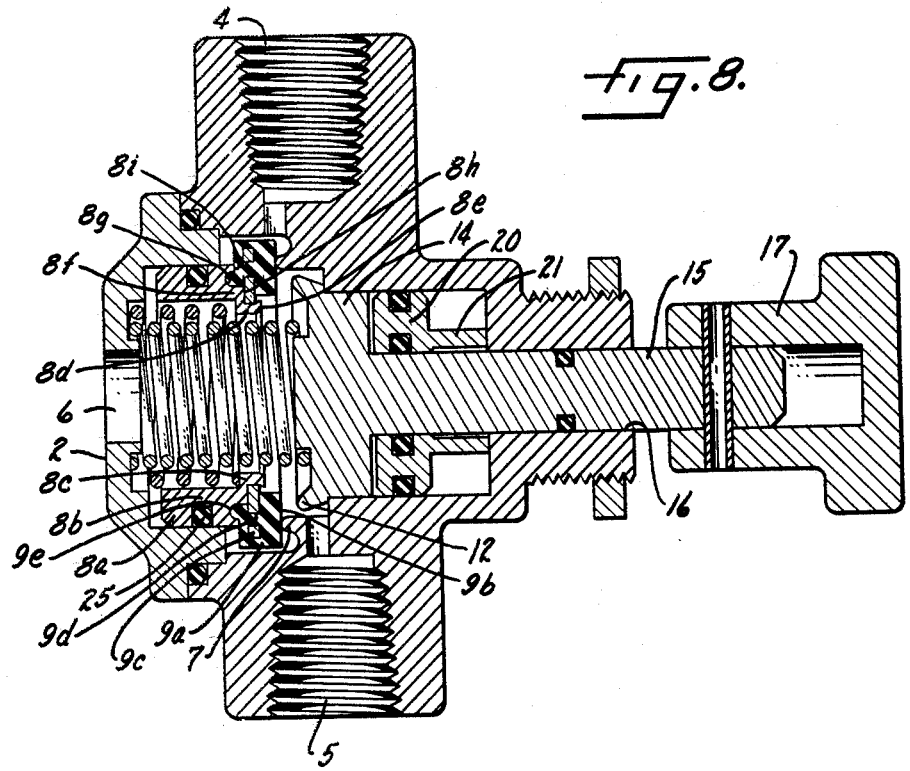

United States Patent Office 3,109,456
Patented Nov. 5, 1963

3,109,456
DASH CONTROL VALVE
Charles Horowitz, Chicago, and Harold L. Dobrikin, Highland Park, Ill., assignors to Berg Airlectro Products Co., Chicago, Ill., a corporation of Illinois
Filed Aug. 11, 1961, Ser. No. 131,005
2 Claims. (Cl. 137—627.5)

This invention relates to control valves and has particular relation to a valve mountable on the dash of a tractor and effective to control elements of an air brake system such as that employed in tractor-trailer truck combinations.

One purpose of the invention is to provide a control valve for controlling a fluid pressure brake system having brake chambers for applying the brakes and spring-operated parking brake cylinders effective to operate slack adjuster elements in applying the brakes for parking and in the event of pressure loss in the system.

Another purpose is to provide a control valve as above described and having provisions effective to protect elements of the system with which it is associated, such as the slack adjuster mentioned, against excessive stress resulting from the application of the air pressure force of the system and the spring force of the auxiliary parking and emergency brake system.

Another purpose is to provide such a valve which shall automatically open to charge the system with which it is associated when the service pressure of such system has reached a predetermined level.

Another purpose is to provide such a valve which will automatically sever communication between the air reservoir of the system with which it is associated and the spring-operated parking and emergency brake element of such system when the pressure from said reservoir is diminished below a predetermined level and the service pressure of such system is at zero pressure.

Another purpose is to provide such a valve having provisions for manual operation.

Another purpose is to provide such a valve having provision for return to the system-charging position whenever service pressure in said system is above a predetermined level, even though said valve should be inadvertently manually moved toward the non-charging position.

Another purpose is to provide such a valve having a valve shuttle member of particular construction and capable of long periods of satisfactory operation.

Other purposes will appear from time to time in the course of the specification and claims.

Figure 1:
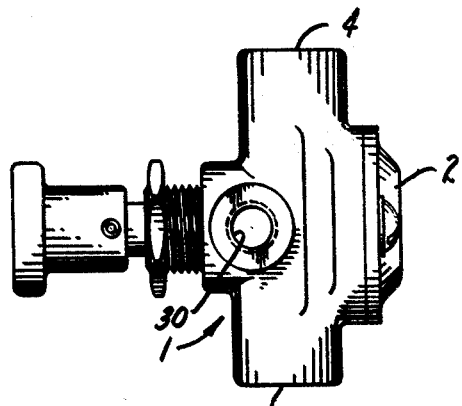
Figure 2:
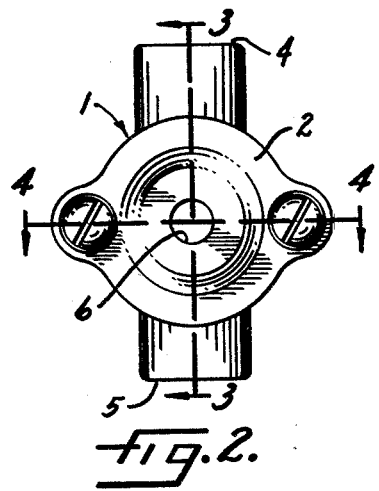
Figure 3:
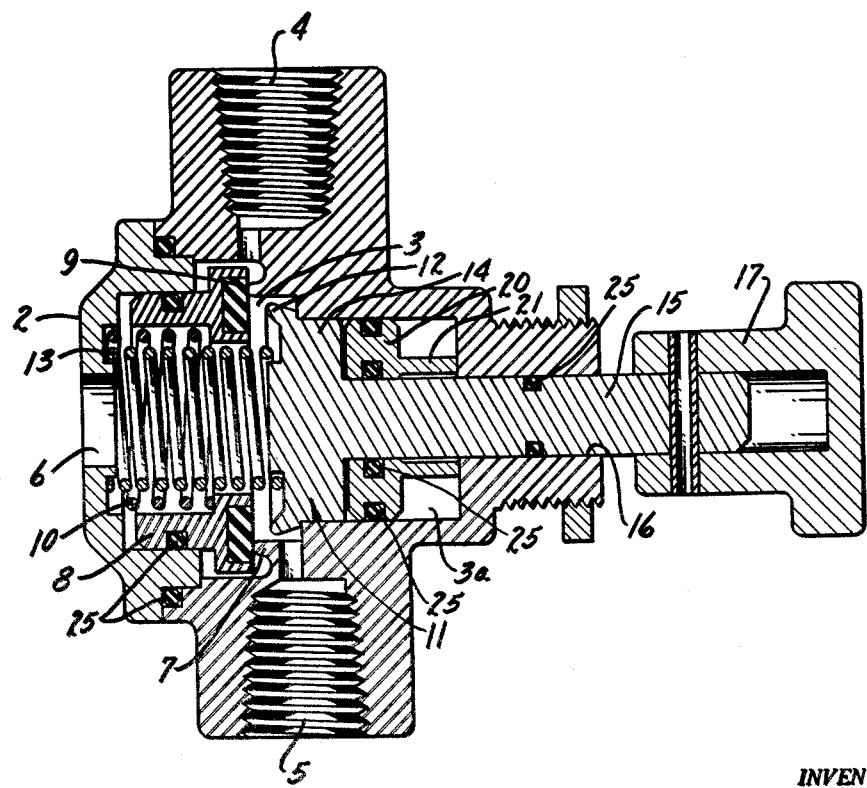
Figure 4:
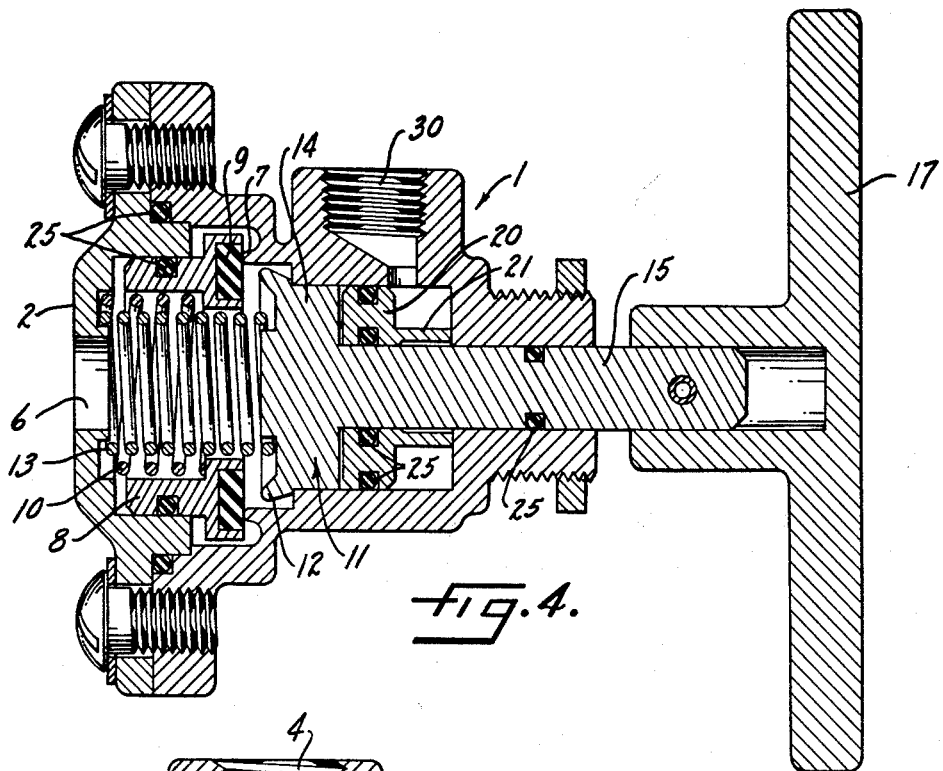
Figure 5:
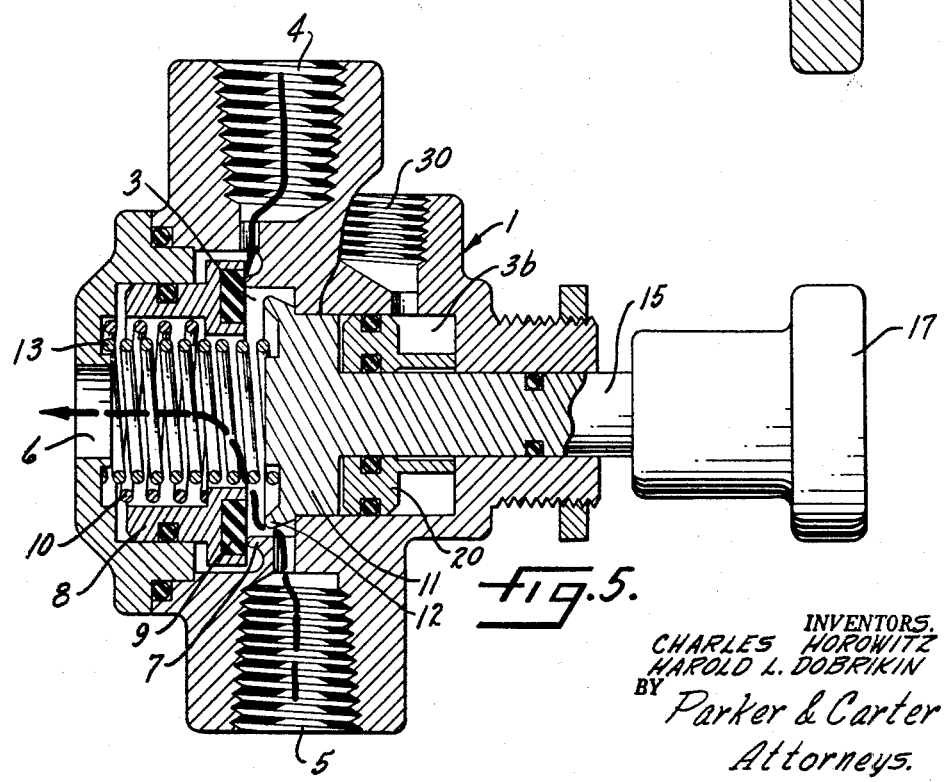
Figure 6:
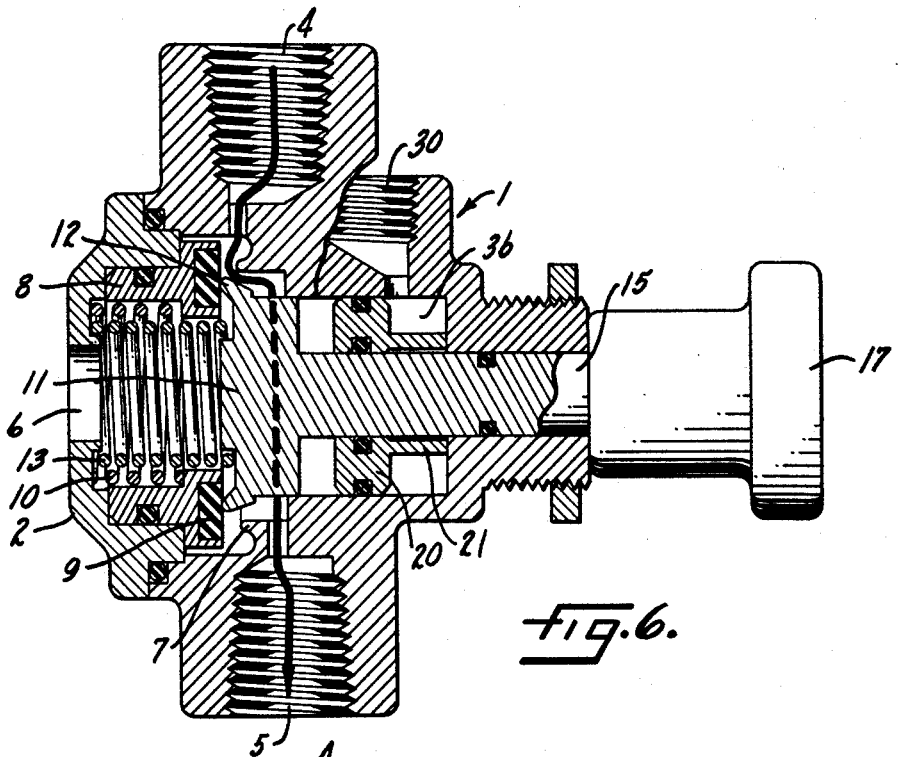
Figure 7:
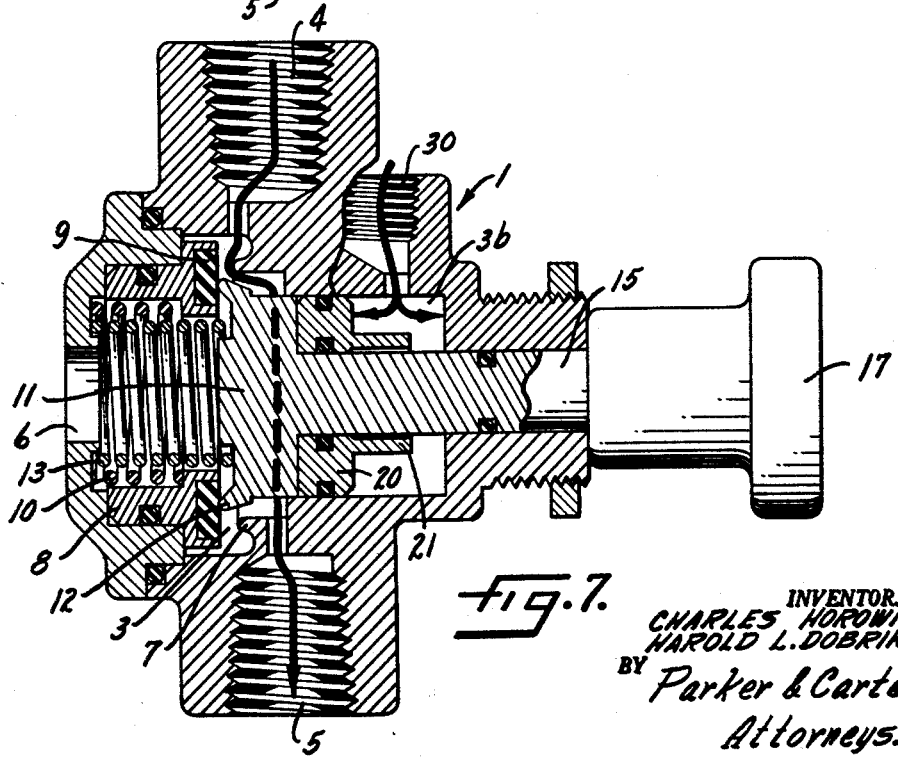

The invention is illustrated more or less diagrammatically in the accompanying drawings, wherein:
 FIGURE 1 is a side elevation;
 FIGURE 2 is an end view;
 FIGURE 3 is a view in cross section taken on the line 3—3 of FIGURE 2 and on an enlarged scale;
 FIGURE 4 is a view in cross section taken on the line 4—4 of FIGURE 2 and on an enlarged scale;
 FIGURE 5 is a side elevation with parts broken away and parts in cross section;
 FIGURE 6 is a view similar to that of FIGURE 5 with parts shown in another position; and
 FIGURE 7 is a view similar to that of FIGURE 5 with parts shown in still another position; and
 FIGURE 8 is a side elevation similar to that of FIGURE 5 and illustrating a variant form.

Like parts are indicated by like numerals throughout the specification and drawings.

The present application is a continuation-in-part of our application Serial Number 84,146, filed January 23, 1961, for "Brake System Control Valve."

Referring now to the drawings, and particularly to FIGURE 1, the numeral 1 generally illustrates a valve housing. The housing 1 has a cavity therein closed by a cover 2.

As best seen in FIGURE 3, the cavity in housing 1 is indicated generally by the numeral 3. A pressure inlet 4 communicates with one side of said cavity, a pressure outlet 5 communicates with another portion of the cavity 3. The cap 2 has an exhaust outlet 6 communicating with another portion of the cavity 3. A circular valve seat 7 is formed in cavity 3 between inlet 4 and outlet 5. A cylindrical shuttle 8 is reciprocal in one end of cavity 3 and carries an annular valve face 9 positioned for seating on valve seat 7. Yielding means 10 has one of its ends exerted against the inner surface of cap 2 and its opposite end exerted against shuttle 8 to urge the valve face 9 toward seat 7. A reduced portion 3a of chamber 3 has reciprocally mounted therein a movable valve seat piston 11 carrying at its inner end a valve seat portion 12. Yielding means 13 has one of its ends exerted against the inner surface of cap 2 and its opposite end exerted against movable valve seat 12 to urge the same away from valve face 9. The member 11 has a reduced portion 14 in slidable engagement with the inner cylindrical surface of chamber 3a. The valve seat portion 12 at its point of juncture with the reduced portion 14, provides a limit stop abutment limiting the movement of valve seat 12 away from valve face 9 by contact with the abutment formed by the reduction of cavity 3 to form cavity portion 3a. The member 11 has integral therewith a shaft 15 extending from member 11 in a direction away from valve face 9 and through a bore 16 in housing 1 to a point outwardly thereof. The outer portion of shaft 15 carries manually operable handle member 17.

Slidable on shaft 15 within chamber 3a is a thrust piston 20. The piston 20 has a reduced sleeve portion or extension 21 extending along and about shaft 15 toward bore 16 and serving to limit the movement of piston 20 in a direction away from member 11.

Suitable seal members are provided between the cap 2 and housing 1, within a groove in the outer circumferential wall of shuttle 8 and in contact with the surrounding inner cylindrical surface of cap 2, and within grooves in piston 20 and in contact with the inner cylindrical surface of chamber 3a and the outer cylindrical surface of shaft 15, the said seals being indicated by the numeral 25.

As best seen in FIGURES 4 and 5, the housing 1 has a second pressure inlet 30 formed therein and communicating with cavity portion 3a at a point positioned beyond thrust piston 20 from member 11, and thus with the annular chamber 3b formed in cavity portion 3a by the inner cylindrical wall thereof and the rearward sleeve extension 21 of piston 20.

In FIGURES 5, 6 and 7 lines and arrows have been added in illustration of fluid pressure paths and effects in the valve of the invention and to aid in applying the description of the use and operation of the invention which follows.

In FIGURE 8 those parts corresponding to parts illustrated in FIGURES 1–7 and described above have been numbered identically for convenience. The shuttle member 8a illustrated in FIGURE 8 has a major circumferential body portion 8b and an annular groove formed in the outer surface thereof to retain a seal ring 25 in the manner of shuttle 8. Shuttle 8a, however, has an inwardly directed flange 8c at its end nearest seat 7 and a cylindrical sleeve 8d axially aligned with body 8b and extending from the inner edge of annular flange 8c and integrally therewith toward the area within seats 7 and 12. The outer diameter of sleeve 8d is less than that of body portion 8b.

A valve face 9a is formed of a mass of material having the properties of rubber. The face 9a is molded in the form of an annulus having an annular face 9b of sufficient radial width to overlies and occupy a position for contact with seats 7 and 12. The face member 9a is molded upon and about portions of a rigid ring element 9c which has a plurality of circumferentially spaced apertures 9d through which the material of member 9a flows in molding and in which said material remains to form a mechanical lock, in addition to any adhesive bond resulting from the molding process, between members 9a and 9c. An inner annular segment 9e of ring 9c is left exposed and surrounds sleeve 8d. The ring 9c being of less thickness than the axial extension of sleeve 8d whereby an end segment 8e of sleeve 8d may be outwardly flared or bent as shown in FIGURE 8 to clamp the exposed segment of ring 9c securely to shuttle body 8b.

The annular end segment 8f of shuttle 8a which opposes seats 7 and 12 has an annular groove 8g therein and a pair of offset annular end surfaces 8h and 8i on opposite sides of said groove. An exposed inner annular surface of ring 9c seats and is clamped against surface 8h and a portion of valve face member 9a, which overlies the remainder of the annular surface of ring 9c opposite that overlaid by face portion 9b, seats and is clamped against surface 8i. A ridge 9e rises from the inner annular edge of the rear surface of member 9a and seats and is clamped within the groove 8g.

The use and operation of the invention are as follows:
Fluid pressure is provided at inlet 4. As indicated by the arrow in the upper portion of FIGURE 5 said fluid pressure is delivered to one side of valve seat 7. With the valve face 9 seated thereon, the said pressure is precluded from passing through the valve of the invention.

To operate the valve, the operator may manually move the handle 17 toward housing 1 to move member 11 against valve face 9. When the movable valve seat 12 is continued against valve face 9, the said valve face may be moved, against the action of spring 10, off seat 7 to open communication between the inlet 4 and the outlet 5. It will be observed, as the parts are shown on the drawings, that pressure outlet 5 is in communication through cavity 3 and annular valve face 9 and springs 10, 13, with exhaust outlet 6. Upon contact of movable valve seat 12 with valve face 9, however, communication between pressure outlet 5 and exhaust outlet 6 is severed. The pressure entering inlet 4, when valve face 9 is in contact with the movable valve seat 12 and out of contact with fixed valve seat 7, is active against the exposed portion of valve face 9 and the recessed rear portion of movable valve seat 12 to aid in retaining the valve in open position.

Pressure inlet 30 is provided for attachment to the service air system of, for example, a truck-trailer vehicle. Service pressure is delivered by inlet 30 to annular chamber 3b behind thrust piston 20. Upon delivery of sufficient pressure at inlet 30 it will be apparent that thrust piston 20 will be moved toward valve face 9 and will carry with it the movable valve seat 12 to unseat valve face 9 from fixed seat 7 and to maintain valve face 9 in contact with movable seat 12. Since thrust piston 20 is slidable on shaft 15, it will be further apparent that a failure or lack of service pressure at inlet 30, with the movable valve seat holding valve face 9 off its fixed seat 7, would merely permit thrust piston 20 to return to the position shown in FIGURES 3–5, while allowing the movable valve seat 12 to hold valve face 9 off its seat 7.

When it is desired to exhaust the system, the operator may merely retract, by means of handle 17, the member 11 toward the position illustrated in FIGURES 3–5. Once the valve face 9 is seated on its seat 7, the spring 13 is effective to urge member 11 to the position illustrated in FIGURES 3–5. Upon separation of movable valve seat 12 from valve face 9, and the contact of valve face 9 with fixed seat 7, an exhaust passage is opened from inlet 5 through cavity 3, springs 10, 13, and annular valve face 9 to exhaust outlet 6, to exhaust the system connected to outlet 5 to atmosphere.

It will be understood that an appropriate and suitable employment of the invention disclosed herein would envision the connection of a fluid pressure reservoir of a tractor-trailer fluid pressure system to the inlet 4, the connection of pressure outlet 5 to a spring-operated parking and emergency brake cylinder wherein such air would be delivered to one side of a piston in said cylinder to hold said parking and emergency brake against application, and to compress the spring in said cylinder on the opposite side of said piston, it being understood that a lack of air pressure in said parking and emergency brake cylinder enables the spring therein to apply the brakes. The inlet 30 is envisioned as being connected to a source of service pressure on said tractor-trailer combination vehicle. It will be further understood that the pressure outlet 5, in addition to being arranged for delivery of fluid pressure to one side of the piston in a parking and emergency brake cylinder, the said outlet 5 can be expected to be secured also to other elements in a fluid pressure brake system.

The supply of fluid pressure from outlet 5 to one side of a piston in a parking and emergency brake cylinder is effective to hold said piston in retracted position, thus to protect the slack adjuster arranged for operation by said piston against the continuous application of the force of the spring in said cylinder while permitting said slack adjuster to be operated by the normal service brake system of the vehicle, and thus precluding the excessive stress upon the slack adjuster which would be produced by the two forces of the service system and the spring in said cylinder.

Similarly, should the operator for any reason fail to manually operate the handle 17 to charge the fluid pressure brake system of the vehicle, the service pressure in said system, when above a predetermined level, say 80 p.s.i., is effective to automatically, through the mediacy of thrust piston 20, open the valve to charge the system. Further, should there be no pressure in the service system and, therefore, no pressure delivered to inlet 30 and thrust piston 20, the valve of the invention will automatically sever communication between a fluid pressure reservoir connected to inlet 4 and the parking and emergency brake cylinder whenever the pressure in the line from the air reservoir drops below a predetermined level, say, 38 p.s.i., at which point the springs 10, 13 are effective to return the parts to the position illustrated in FIGURE 5. Should such diminution of air reservoir pressure and lack of serice pressure in the system occur, the parking and emergency brake cylinder will be exhausted through outlet 5 and exhaust outlet 6, as above described, causing an immediate application of the brakes of the vehicle through operation of the piston by the spring in the parking and emergency brake cylinder. Thus, the vehicle is brought to immediate halt upon diminution of the fluid pressure below an adequate safe level. Should the operator inadvertently retract handle 17 when adequate safe service pressure is available at inlet 30, it will be clear that such pressure will be automatically effective against thrust piston 20 to return the valve to the operating position shown in FIGURE 7, for example.

In the form shown in FIGURE 8 the shuttle 8a has a valve face 9a which is molded upon and mechanically interlocked with a ring 9c which is in turn clamped to or mechanically locked upon shuttle body 8b to secure ring 9c thereto and to clamp a rear portion of member 9a to body 8b. Thus is provided a positive securement of valve face 9a to shuttle 8a effective through a long life of repeated operations of the valve.

Whereas a preferred embodiment of the invention has been described and claimed, it will be understood that further modifications will suggest themselves to those skilled in the art upon a reading of the foregoing specification. Accordingly, the foregoing description should be taken as merely illustrative and not definitive, and the scope of the invention should be limited only by the following appended claims.

For example, the annular bead 9e seating within groove 8g acts as a seal to preclude the passage of fluid such as air under pressure between the members 8a and 9a. While as shown in the drawings the parts are perfectly matched, it will be clear that manufacturing exigencies are such as to produce an occasional spacing or mismatching of parts which, if not overcome, could produce leaks. The bead 9e acts in the manner of an O ring in seating in groove 8g and the presence of fluid pressure attempting to pass between members 8a, 9a will cause the bead 9e to deform into any cavitites or spaces present so as to seal them. While the bead 9e is shown as having been formed integrally with the remainder of member 9a it will be realized that bead 9e could be formed separately in the manner of an O ring, for example, without departing from the nature and scope of the invention.

We claim:

1. In a fluid pressure control valve a housing, a fluid pressure inlet in said housing, a fluid pressure outlet in said housing, a fixed valve seat between said inlet and said outlet, a valve face member yieldingly urged toward said fixed seat, said valve face member comprising a shuttle body, a valve face carried by said body for seating upon said fixed seat, said face comprising an annular mass of rubber-like material molded upon and mechanically locked to a ring, said ring being mechanically locked to said body, a groove in said body, an annulus of rubber-like material seated in said groove and held therein by said valve face, and means for moving said valve face away from said fixed seat, including a movable valve seat in said housing, a thrust member slidably mounted in said housing, and means for delivering fluid pressure to said thrust member to move the same against said movable valve seat in the direction of said valve face.

2. In a fluid pressure control valve a housing, a fluid pressure inlet in said housing, a fluid pressure outlet in said housing, a fixed valve seat between said inlet and said outlet, a valve face member yieldingly urged toward said fixed seat, said valve face member comprising a shuttle body, a valve face carried by said body for seating upon said fixed seat, said face comprising an annular mass of rubber-like material molded upon and mechanically locked to a ring, said ring being mechanically locked to said body, said face having a rear portion clamped between said ring and said shuttle body, and means for moving said valve face away from said fixed seat, including a movable valve seat in said housing, a thrust member slidably mounted in said housing, and means for delivering fluid pressure to said thrust member to move the same against said movable valve seat in the direction of said valve face.

References Cited in the file of this patent
UNITED STATES PATENTS

| | | |
|---|---|---|
| 2,683,621 | Boyer | July 13, 1954 |
| 2,839,264 | Trubert | June 17, 1958 |
| 2,985,143 | Stelzer | May 23, 1961 |